(12) United States Patent
Di et al.

(10) Patent No.: US 12,072,459 B2
(45) Date of Patent: Aug. 27, 2024

(54) SUBSURFACE PROPERTY ESTIMATION IN A SEISMIC SURVEY AREA WITH SPARSE WELL LOGS

(71) Applicant: SCHLUMBERGER TECHNOLOGY CORPORATION, Sugar Land, TX (US)

(72) Inventors: Haibin Di, Houston, TX (US); Xiaoli Chen, Houston, TX (US); Hiren Maniar, Houston, TX (US); Aria Abubakar, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 56 days.

(21) Appl. No.: 17/758,514

(22) PCT Filed: Jan. 11, 2021

(86) PCT No.: PCT/US2021/012886
§ 371 (c)(1),
(2) Date: Jul. 8, 2022

(87) PCT Pub. No.: WO2021/142406
PCT Pub. Date: Jul. 15, 2021

(65) Prior Publication Data
US 2023/0026857 A1 Jan. 26, 2023

Related U.S. Application Data

(60) Provisional application No. 62/959,374, filed on Jan. 10, 2020.

(51) Int. Cl.
*G01V 1/28* (2006.01)
*G01V 1/30* (2006.01)
(Continued)

(52) U.S. Cl.
CPC ............. *G01V 1/282* (2013.01); *G01V 1/306* (2013.01); *G01V 1/345* (2013.01); *G01V 1/48* (2013.01);
(Continued)

(58) Field of Classification Search
None
See application file for complete search history.

(56) References Cited

U.S. PATENT DOCUMENTS

| 5,444,619 A * | 8/1995 | Hoskins .................. G01V 1/306 |
| | | 702/14 |
| 2009/0119018 A1* | 5/2009 | Priezzhev .............. G01V 1/301 |
| | | 702/11 |

(Continued)

OTHER PUBLICATIONS

Ketineni et al. "Structuring an Integrative Approach for Field Development Planning Using Artificial Intelligence and its Application to an Offshore Oilfield." Paper presented at the SPE Annual Technical Conference and Exhibition, Houston, Texas, USA, Sep. 2015. (Year: 2015).*

(Continued)

*Primary Examiner* — Raymond L Nimox
(74) *Attorney, Agent, or Firm* — Jeffrey D. Frantz

(57) ABSTRACT

A method for seismic processing includes extracting, using a first machine learning model, one or more seismic features from seismic data representing a subsurface domain, receiving one or more well logs representing one or more subsurface properties in the subsurface domain, and predicting, using a second machine learning model, the one or more subsurface properties in the subsurface domain at a location that does not correspond to an existing well based on the seismic data, the one or more well logs, and the one or more seismic features that were extracted from the seismic data.

19 Claims, 9 Drawing Sheets

(51) Int. Cl.
- *G01V 1/34* (2006.01)
- *G01V 1/48* (2006.01)
- *G06N 3/045* (2023.01)
- *G06N 3/08* (2023.01)

(52) U.S. Cl.
CPC ............... *G06N 3/045* (2023.01); *G06N 3/08* (2013.01); *G01V 2210/74* (2013.01)

(56) References Cited

U.S. PATENT DOCUMENTS

| | | | |
|---|---|---|---|
| 2018/0106917 | A1 | 4/2018 | Osypov et al. |
| 2019/0025461 | A1 | 1/2019 | Wiener et al. |
| 2019/0034812 | A1* | 1/2019 | Borrel .................. G01V 99/005 |
| 2022/0113440 | A1* | 4/2022 | Griffith .................. G01V 1/308 |

OTHER PUBLICATIONS

S. Chaki, A. Routray and W. K. Mohanty, "Well-Log and Seismic Data Integration for Reservoir Characterization: A Signal Processing and Machine-Learning Perspective," in IEEE Signal Processing Magazine, vol. 35, No. 2, pp. 72-81, Mar. 2018, doi: 10.1109/MSP.2017.2776602. (Year: 2018).*

Search Report and Written Opinion of International Patent Application No. PCT/US2021/012886 issued on Apr. 22, 2021; 9 pages.

Di et al., "Seismic acoustic impedance estimation by learning from sparse wells via deep neural networks", 82nd EAGE Conference + Exhibition 2020, Jun. 2020, 5 pages.

Alfarraj and AlRegib, "Semi-supervised sequence modelling for elastic impedance inversion", Interpretation, 7, SE237-SE249, 2019.

Carron, "High Resolution Acoustic Impedance Cross-Sections from Wireline and Seismic Data", SPWLA 30th Annual Logging Symposium, Society of Petrophysicists and Well-Log Analysis, 22 pages, 1989.

Cooke and Schneider, "Generalized linear inversion of reflection seismic data", Geophysics, vol. 48, No. 6, pp. 665-676, 1983.

Di et al., "Seismic stratigraphy interpretation via deep convolutional neural networks", 89th SEG Technical Program Expanded Abstracts, pp. 2358-2362, 2019.

Ferguson and Margrave, "A simple algorithm for band-limited impedance inversion", CREWES Research Report, vol. 8, pp. 21-1-21-10.

Gholami, "Nonlinear multichannel impedance inversion by total-variation regularization", Geophysics, vol. 80, Issue 5, Sep. 2015, pp. R217-R224.

Jamali Hondori et al., "A random layer-stripping method for seismic reflectivity inversion", Exploration Geophysics, vol. 44, pp. 70-76, 2013.

Li et al., "Semi-supervised deep machine learning assisted seismic image segmentation and stratigraphic sequence interpretation", 81st EAGE Conference & Exhibition, Th_P04_04, 2019, 6 pages.

Oliveira et al., "Nonlinear impedance inversion for attenuating media", Geophysics, vol. 74, Issue 6, Nov. 2009, pp. R111-R117.

Robinson, "Predictive decomposition of time series with application to seismic exploration", Geophysics, vol. 32, No. 3, Jun. 1967, pp. 418-484.

Wang et al., "Seismic impedance inversion based on cycle-consistent generative adversarial network", 89th SEG Technical Program Expanded Abstract, 2019, pp. 2498-2502.

Zhang and Yin, "An acoustic impedance inversion approach using discrete inversion theory", 74th SEG Technical Program Expanded Abstracts, 2004, pp. 1854-1857.

Hampson, D. P. et al., "Use of multiattribute transforms to predict log properties from seismic data", Geophysics, 2001, 66(1), 17 pages.

Alfarraj et al., Petrophysical property estimation from seismic data using recurrent neural networks, 88th SEG Technical Program Expanded Abstracts, pp. 2141-2146, 2018.

Extended Search Report issued in European Patent Application No. 21738207.6 dated Jan. 16, 2024, 10 pages.

* cited by examiner

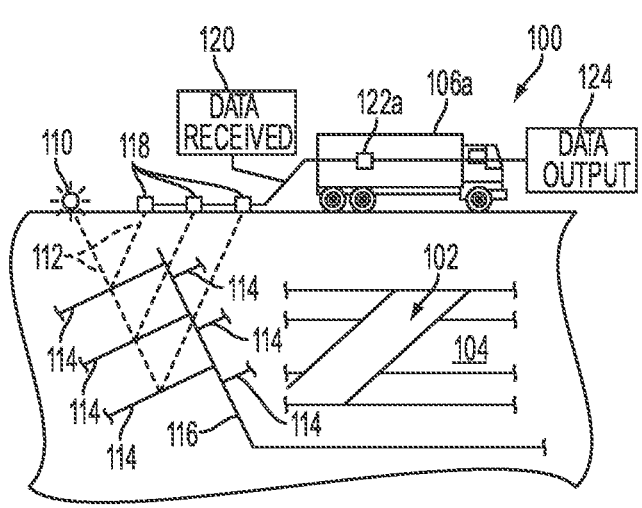
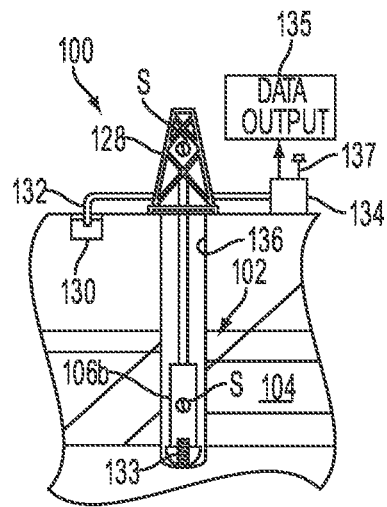
FIG. 1A
FIG. 1B
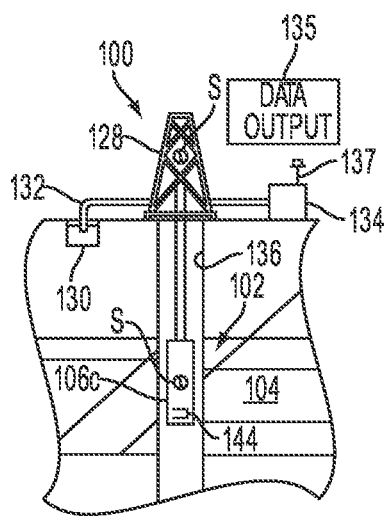
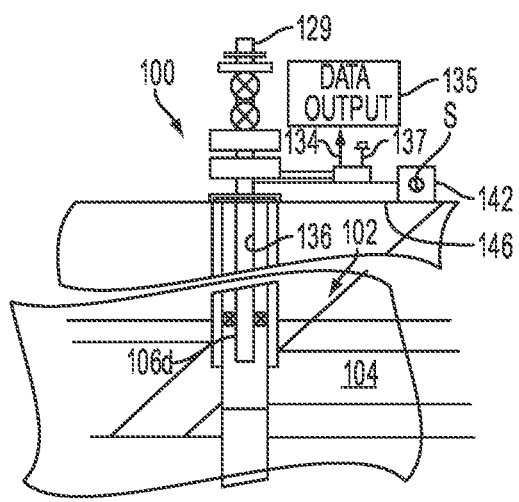
FIG. 1C
FIG. 1D

SUBSURFACE PROPERTY ESTIMATION IN A SEISMIC SURVEY AREA WITH SPARSE WELL LOGS

CROSS-REFERENCE TO RELATED APPLICATIONS

This application is a National Stage Entry of International Patent Application No. PCT/US2021/012886, filed on Jan. 11, 2021, which claims priority to U.S. Provisional Patent Application having Ser. No. 62/959,374, which was filed on Jan. 10, 2020, and is incorporated herein by reference in its entirety.

BACKGROUND

In subsurface mapping and reservoir interpretation, subsurface properties such as acoustic impedance are sometimes estimated from seismic data. The seismic data may be available for a relatively large area, but at a relatively low resolution, e.g., as compared to well logs. Well logs, in comparison, are generally sparsely available in a surveyed area. To compensate for limitations in seismic data, one approach is to integrate the seismic data with the well logs that are available. Such integration generally includes selecting a non-linear mapping function between the seismic data and the well logs.

Existing mapping methods, particularly these powered by machine learning, are generally performed in one dimension and/or require down-sampling of well logs to the seismic scale. As a consequence, the estimation may be valid around the training wells, but proves to be unreliable throughout the entire seismic survey.

SUMMARY

Embodiments of the disclosure include a method that includes extracting, using a first machine learning model, one or more seismic features from seismic data representing a subsurface domain, receiving one or more well logs representing one or more subsurface properties in the subsurface domain, and predicting, using a second machine learning model, the one or more subsurface properties in the subsurface domain at a location that does not correspond to an existing well based on the seismic data, the one or more well logs, and the one or more seismic features that were extracted from the seismic data.

Embodiments of the disclosure also include a non-transitory computer-readable medium storing instructions that, when executed by at least one processor of a processing system, cause the processing system to perform operations. The operations include extracting, using a first machine learning model, one or more seismic features from seismic data representing a subsurface domain, receiving one or more well logs representing one or more subsurface properties in the subsurface domain, and predicting, using a second machine learning model, the one or more subsurface properties in the subsurface domain at a location that does not correspond to an existing well based on the seismic data, the one or more well logs, and the one or more seismic features that were extracted from the seismic data.

Embodiments of the disclosure further include a computing system including one or more processors, and a memory system including one or more non-transitory computer-readable media storing instructions that, when executed by at least one of the one or more processors, causes the computing system to perform operations. The operations include extracting, using a first machine learning model, one or more seismic features from seismic data representing a subsurface domain, receiving one or more well logs representing one or more subsurface properties in the subsurface domain, and predicting, using a second machine learning model, the one or more subsurface properties in the subsurface domain at a location that does not correspond to an existing well based on the seismic data, the one or more well logs, and the one or more seismic features that were extracted from the seismic data.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

DESCRIPTION OF EMBODIMENTS

Figure 2:
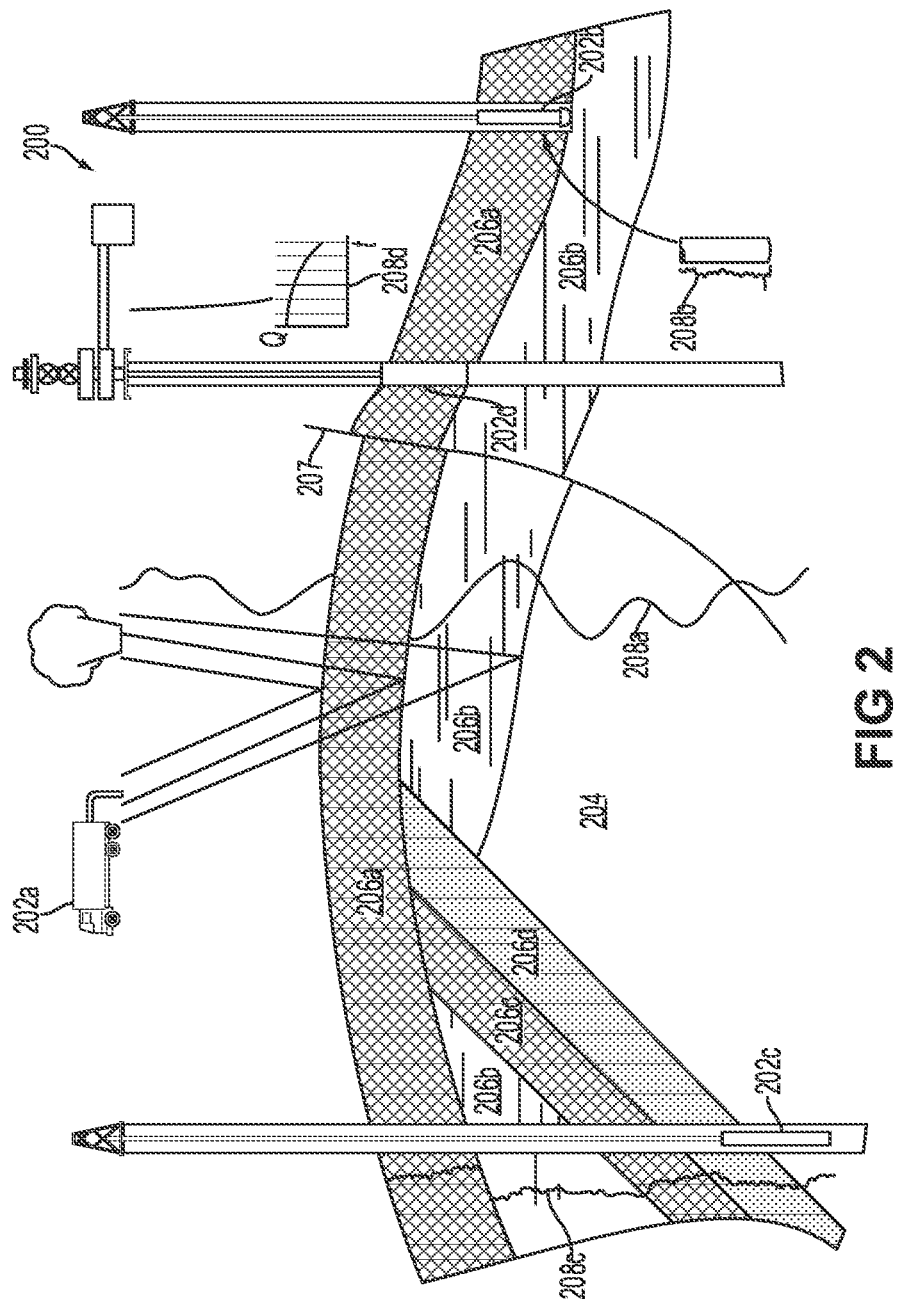

Embodiments of the present disclosure may provide processing methods that employ machine learning for estimating subsurface properties (e.g., acoustic impedance, porosity, density, etc.) over a given seismic survey. For example, the method may estimate or "predict" the subsurface properties by learning from a small number of sparsely-distributed wells using one or more machine learning models (e.g., deep neural networks).

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106c suspended by rig 128 and into wellbore 136 of FIG. 1B. Wireline tool 106c is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106c may be operatively connected to, for example, geophones 118 and a computer 122a of a seismic truck 106a of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106cto measure downhole parameters which relate to, for example porosity, permeability, fluid composition and/or other parameters of the field operation.

FIG. 1D illustrates a production operation being performed by production tool 106d deployed from a production unit or Christmas tree 129 and into completed wellbore 136 for drawing fluid from the downhole reservoirs into surface facilities 142. The fluid flows from reservoir 104 through perforations in the casing (not shown) and into production tool 106d in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more well sites.

FIG. 2 illustrates a schematic view, partially in cross section of oilfield 200 having data acquisition tools 202a, 202b, 202a cand 202d positioned at various locations along oilfield 200 for collecting data of subterranean formation 204 in accordance with implementations of various technologies and techniques described herein. Data acquisition tools 202a-202d may be the same as data acquisition tools 106a-106d of FIGS. 1A-1D, respectively, or others not depicted. As shown, data acquisition tools -202d generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208c may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208b and/or log data from well log 208c are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modeling techniques.

Figure 3A:
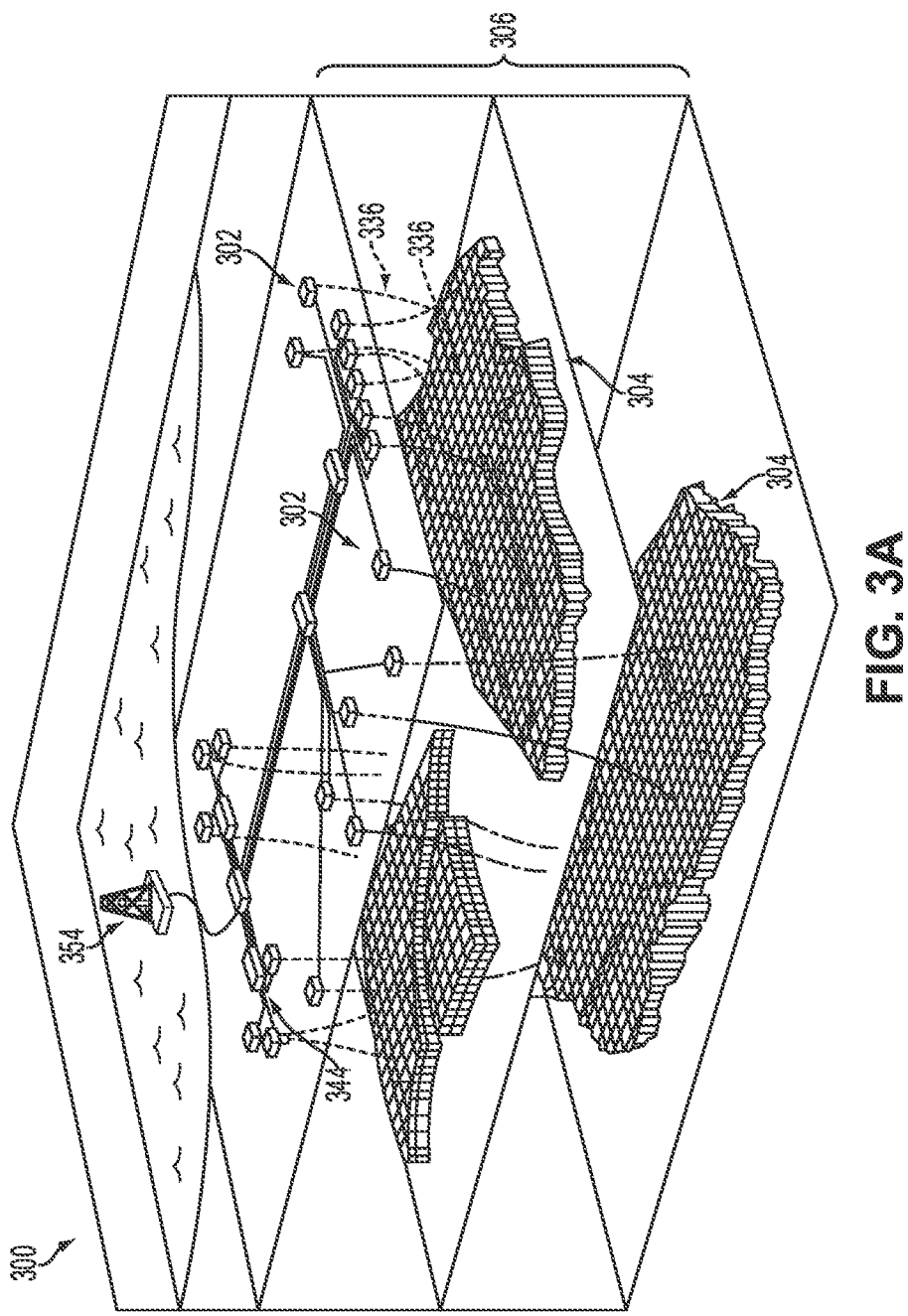

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
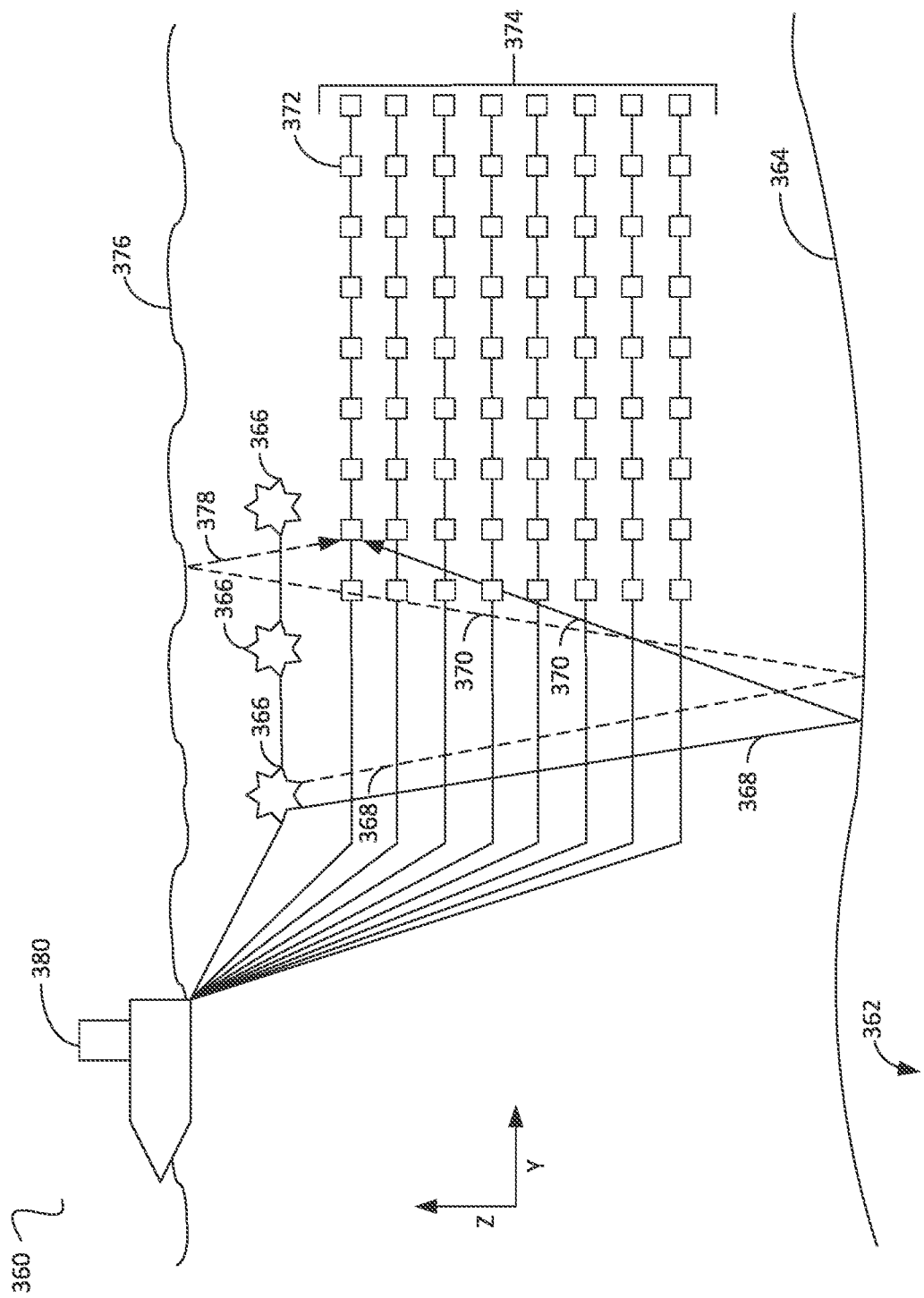

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Estimating subsurface rock properties from seismic data is a task in subsurface mapping and interpretation. For example, subsurface property (e.g., acoustic impedance) estimation techniques have been developed for inversion directly from seismic volumes. However, due to the non-linearity and heterogeneity of the subsurface, one or more regularization terms may be used to find a stable solution, which increases the difficulty of implementation. Moreover, because of the bandwidth of seismic data, the estimated subsurface rock properties may be non-unique and relative, and may be deviated from the ground truth, especially in the deep areas of complicated geology conditions.

One solution to compensate for the bandwidth of the seismic data is to integrate with well logs, which represent directly measurements of at least some of the subsurface rock properties, e.g., including density and velocity. Such an integration may first construct a mapping function between seismic signals and the rock properties measured at the wells, and then consistently applying the mapping function throughout the seismic survey. Machine learning, such as convolutional neural networks, recurrent neural networks, and generative adversarial networks, may be implemented for building the non-linear seismic-to-well mapping. However, many implementations are in one dimension (1D), which matches a well log with the corresponding single seismic trace. The local seismic patterns are thus ignored from the learning, and the variations in seismic signals increase the risk of unstable prediction. This may cause inaccurate estimations as spikes or blubs in the predicted subsurface property. In addition, down-sampling well logs to the same scale as seismic reduces the resolution. Further, the sparsity of well logs, compared to the large coverage of seismic presents a challenge. Given a small number of wells, the training data availability likewise relatively small, causing the network to be prone to overfitting. In such a case, the estimation would be valid only around the wells, and the mapping function cannot be consistently applied to the entire seismic survey.

Accordingly, embodiments of the present method may estimate subsurface rock properties using two machine-learning models (e.g., two deep neural networks). For example, the first model may "learn" (e.g., unsupervised or "self" learning) the given seismic volume and become knowledgeable of the regional seismic features in the volume, the second model may integrate three-dimensional (3D) seismic data and one-dimensional (1D) well logs by using the regional features already learned in the first machine learning model, which reduces the risk of overfitting and improves the lateral consistency in the subsurface property estimation. Accordingly, embodiments of the disclosure may employ a machine learning workflow for integrating seismic data (e.g., seismic cubes) and well logs to predict subsurface properties, such as those that would normally be captured in a well log, at a location that does not have an existing well.

Figure 4:
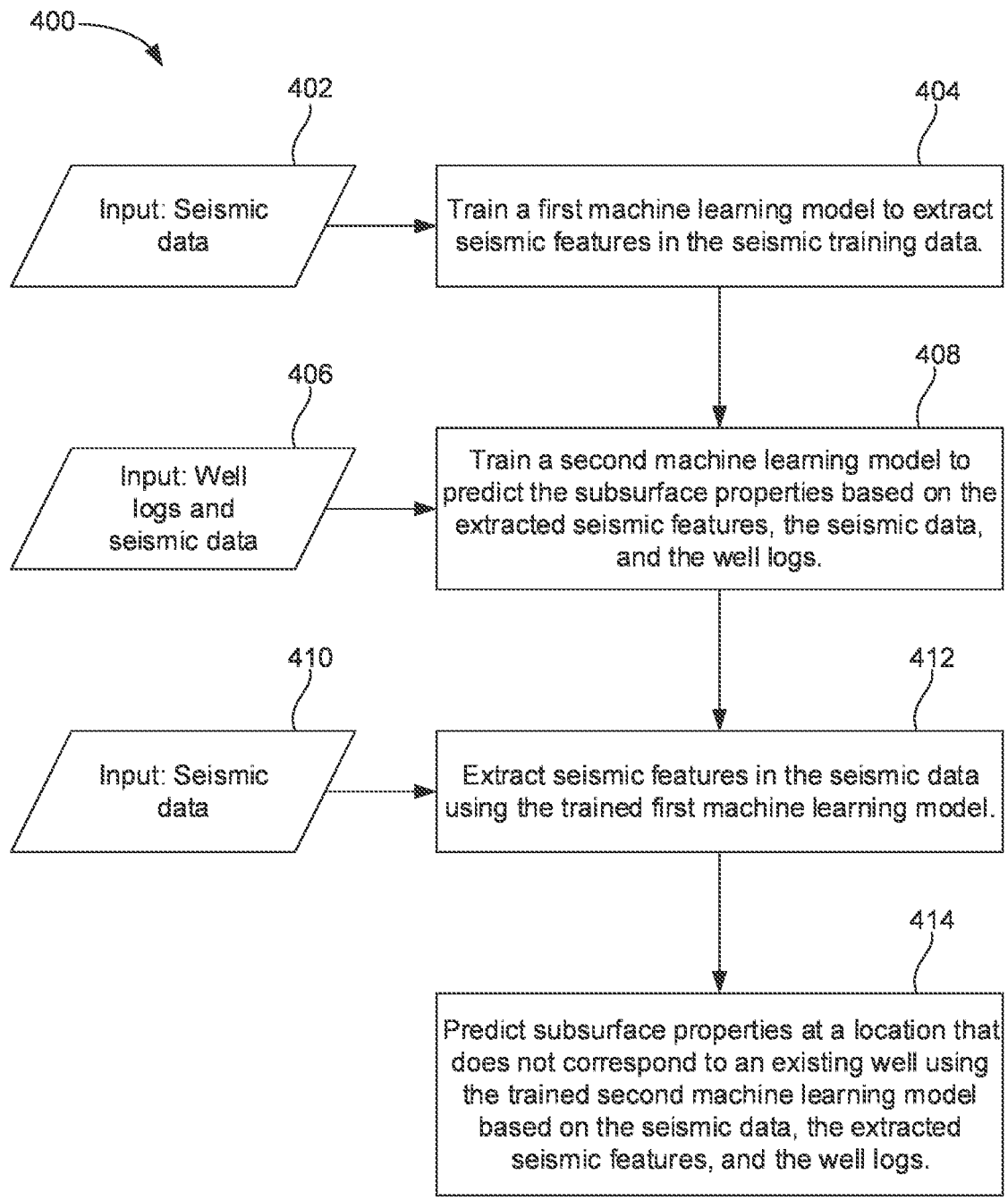
FIG. 4 illustrates a flowchart of a method for predicting subsurface properties based on sparse well logs and seismic data, according to an embodiment.

FIG. 4 illustrates a flowchart of a method 400 for predicting subsurface properties in a subsurface volume (e.g., a survey area) with sparse well log data, according to an embodiment. The method 400 may include receiving seismic data as input, as at 402. The seismic data may be gathered from one or more seismic surveys and may seismically represent the subsurface domain in a given area. Further, the seismic data may include three-dimensional seismic cubes, in at least some embodiments.

A first machine learning model (e.g., a network or engine) may then be trained to extract seismic features in the seismic data, as at 404. As noted above, the first machine learning model may be a deep learning neural network. In other embodiments, other types of machine learning models may be used. Further, the first machine learning model may be trained using supervised, unsupervised, or quasi-unsupervised learning. In particular, the first machine learning model may be trained to extract (e.g., identify) seismic features in the seismic data. In some embodiments, the first machine learning model may be trained as a denoising autoencoder.

One or more well logs, and either the same or potentially additional seismic data, may then be received as input, as at 406. This input, along with the seismic features extracted by the first machine learning model, may be used to train a second machine learning model to predict subsurface properties, as at 408. For example, the well logs may represent one or more subsurface properties, such as acoustic impedance, porosity, density, etc. As noted above, the well logs may be collected from downhole measurements, and thus these measurements may accurately represent the rock properties of the subsurface domain in areas very near to the well but may be less representative of rock properties farther away from the wells. Moreover, the well locations from which such well logs are collected may be relatively sparse, while the area of the seismic survey may be comparatively large. Thus, there may be large areas between well locations for which no well log data is available, but for which seismic data is available.

The second machine learning model may thus be configured to map the (e.g., 3D) seismic data and extracted (e.g., 2D) seismic features to the (e.g., 1D) well logs, as will be described in greater detail below. The second machine learning model may then be configured to predict the subsurface properties at any location away from the existing wells, e.g., providing a hypothetical or "synthetic" well log representing the subsurface properties at a position where no well exists.

The foregoing worksteps generally describe the training of the first and second machine learning models. These models may be trained for a specific survey area, based on the input (seismic data, seismic features, and well logs) that is available. Once the models are trained, the method 400 may proceed into an implementation stage. Specifically, seismic data may be taken as input, as at 410. This seismic data may be the same or new seismic data describing the survey area. At 412, the trained first machine learning model may then extract seismic features in the seismic data (e.g., received at 402 and/or 410).

At 414, the trained second machine learning model may then predict subsurface properties at a location that does not correspond to an existing well, based on the seismic data, the extracted seismic features, and the well logs. For example, a user may select a specific location on a map, and the method 400 may respond by predicting the subsurface properties at the selected location. In other embodiments, the method 400 may include predicting the subsurface properties at given spatial intervals across the survey, such that a user may select a prepared prediction. The predicted subsurface properties may be visualized, e.g., in response to a user selection of the location. Further, based on such subsurface property predictions, wells may be planned, e.g., decisions regarding where to locate the well, how to drill the well, the planned trajectory, etc., may be made.

Figure 5A:
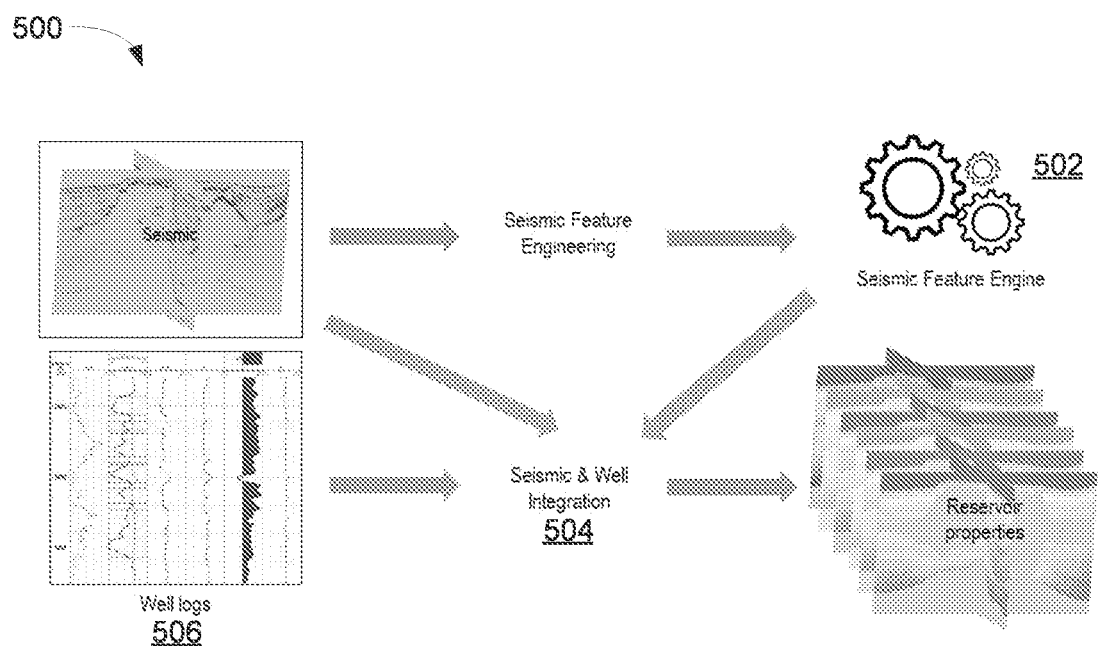
FIG. 5A illustrates a conceptual, schematic view of a workflow for seismic acoustic impedance estimation, according to an embodiment.

FIG. 5A illustrates a functional diagram of a system 500 that implements the method 400, according to an embodiment. The system 500 may include a seismic feature engine 502 that is configured to extract seismic features from seismic data, e.g., a seismic survey of a particular area, such that the seismic feature engine 502 is trained for or "knowledgeable" about the particular survey area. The seismic feature engine 502 may be a machine learning model (e.g., the first machine learning model, as mentioned above) and may be, in some embodiments, a deep neural network. In a specific embodiment, the seismic feature engine 502 may be a self-learning seismic feature (SFSL) extraction engine, which may implement unsupervised or quasi-unsupervised learning. For example, the engine 502 may build regional "knowledge", such that the engine 502 may be configured to provide consistent seismic stratigraphy interpretation from sparse expert picks, and may be applicable to the case of sparse well.

The system 500 may also include a seismic and well integration (SWI) engine 504, which may also be a machine learning model (e.g., the second machine learning model, as mentioned above). For example, the SWI engine 504 may be a deep neural network. The SWI engine 504 may receive the seismic data 501, well logs 506, and seismic features extracted by the seismic feature engine 502. The SWI engine 504 may be configured to make connections between the seismic data, seismic features, and the well logs, in order to predict subsurface properties (e.g., the subsurface properties represented by the well logs 506) at locations where a well does not exist (e.g., a planned location).

Figure 5B:
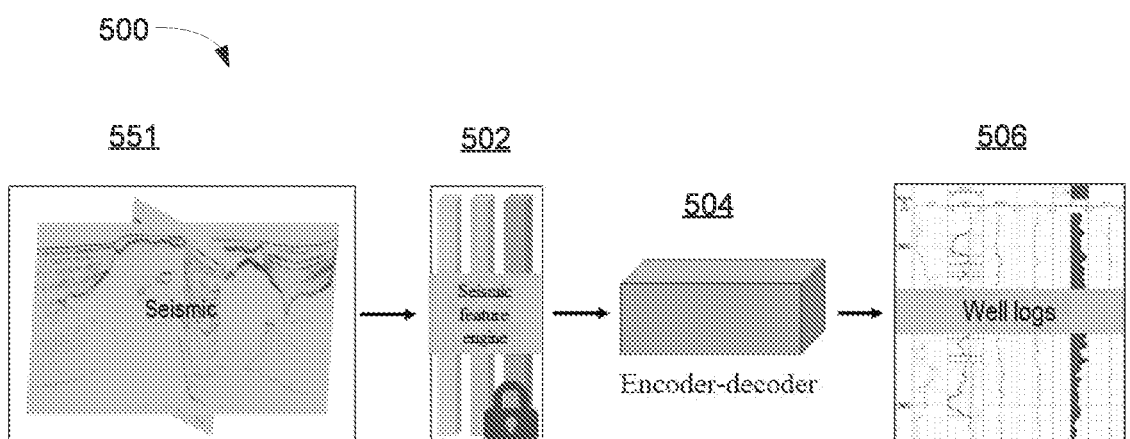
FIG. 5B illustrates a conceptual, schematic view of an architecture of a deep learning neural network for seismic-well integration in the workflow, according to an embodiment.

FIG. 5B illustrates another functional diagram of the system 500, according to an embodiment. As discussed above, the system 500 may input seismic data 551 into a seismic feature engine 502. The seismic feature engine 502 may be trained and implemented to extract seismic features from the seismic data 551, which are then fed to a seismic-well integration (SWI) engine 554. In a specific embodiment, the SWI engine 504 implements an encoder and decoder, as shown, and may also include a fine-tuner. In particular, a 2D encoder, 2D decoder, and 1D fine-tuner may be employed, which may individually contain a set of convolutional layers. The encoder, as a feature generator, extracts a set of 2D features from an input 2D seismic image (e.g., derived from a 3D seismic cube). The decoder, as a feature integrator, combines these 2D features into a set of 1D features. Finally, the fine-tuner maps these 1D features with the given 1D well log.

The two engines 502, 504 are connected by building the SWI network from the trained SFSL network. Compared to training the SWI engine 504 from scratch, the use of SFSL for the seismic feature extraction engine 502 may transfer knowledge of the 3D seismic cube to the SWI engine 504, which makes it also aware of the regional seismic features and significantly reduces the risk of overfitting the small number of well logs. Again, it will be appreciated that self-learning in the seismic extraction (first machine learning) model is merely an illustrative example.

As an experimental example, and not by way of limitation, an embodiment of the present method may be applied to the synthetic 3D SEG-SEAM dataset, which also comes with the corresponding earth models, including density, Vp, Vs, etc. as the ground truth for quality control. In geology, this dataset is dominated by a complex salt intrusion that challenges the existing techniques of subsalt imaging and interpretation. The survey includes 1499 inlines, 1499 crosslines, and 751 samples per trace, with 20 ft (approximately 6 meters) as the sampling interval. The well logs in this dataset covers the same depth, but consists of 1501 samples per well, with 10 ft (approximately 3 meters) as the sampling interval.

In this embodiment, the first machine learning model (e.g., a SFSL network) is an 85-layer convolutional auto-encoder. The SEAM amplitude volume is utilized for training the network, so that the network gains the knowledge of the regional seismic features in the SEAM survey.

The training data for the SWI engine (second machine learning model) may be prepared by (a) randomly selecting 200 points from the given SEAM survey as well locations, (b) retrieving the corresponding density and Vp from the earth models, and (c) multiplying density with Vp as the acoustic impedance curves at these 200 wells. Meanwhile, 21 adjacent amplitude traces are retrieved around each well. This provides us with 200 pairs of 2D seismic images (dimension: 51×751) and 1D wells (length: 1501) as the data for training the SWI network.

After initializing the SWI network with the pre-trained SFSL network, the 200 pairs of training data prepared above are employed to train the SWI network in, e.g., 2000 epochs. The mean-absolute-error may be used as the loss, and the Adam optimizer is utilized for loss minimization.

The trained SWI network may then be applied to a seismic data set (e.g., SEAM survey data), which provides the corresponding acoustic impedance volume, as at 808. The acoustic impedance volume covers the same area as the seismic data but is at the same scale as the wells, e.g., with 10 ft (approximately 3 meters) as the vertical sampling interval.

Figure 6:
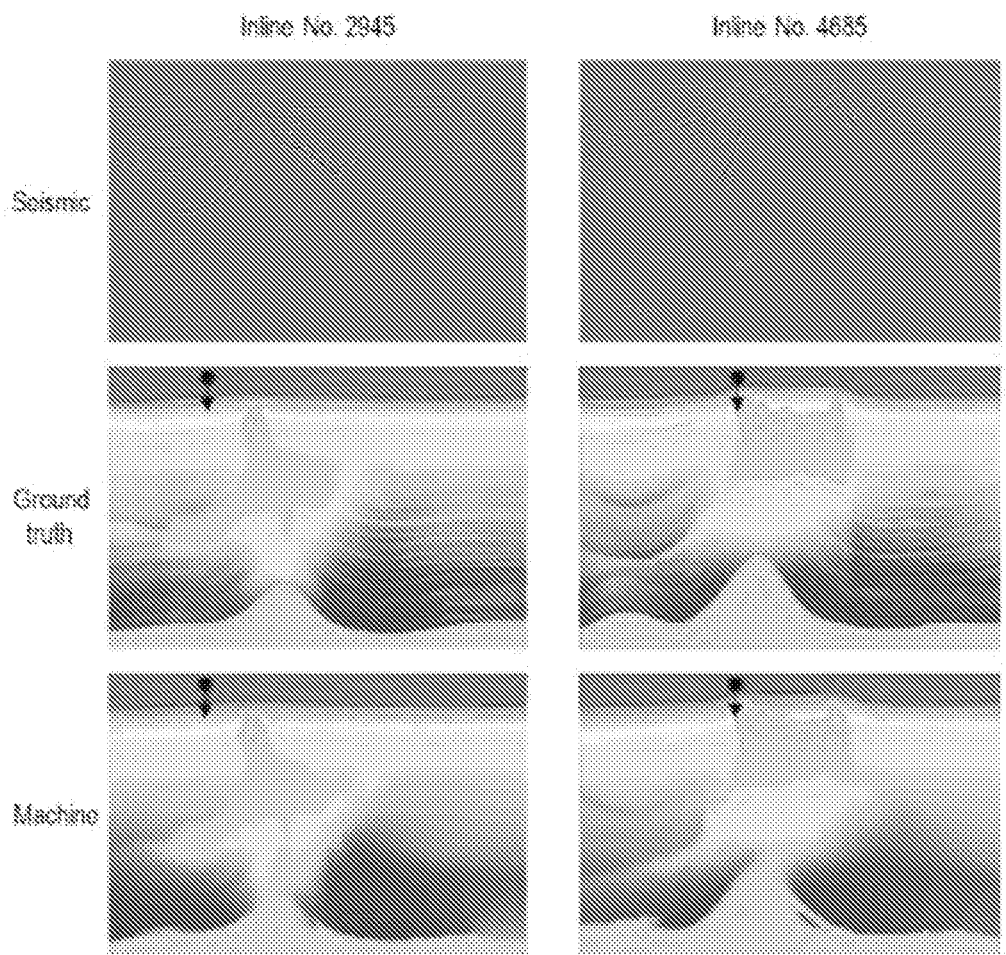
FIG. 6 illustrates a comparison of acoustic impedance at two inline sections (#2945 and #4685) between a ground truth and an estimation made using an embodiment of the workflow disclosed herein.
Figure 7A:
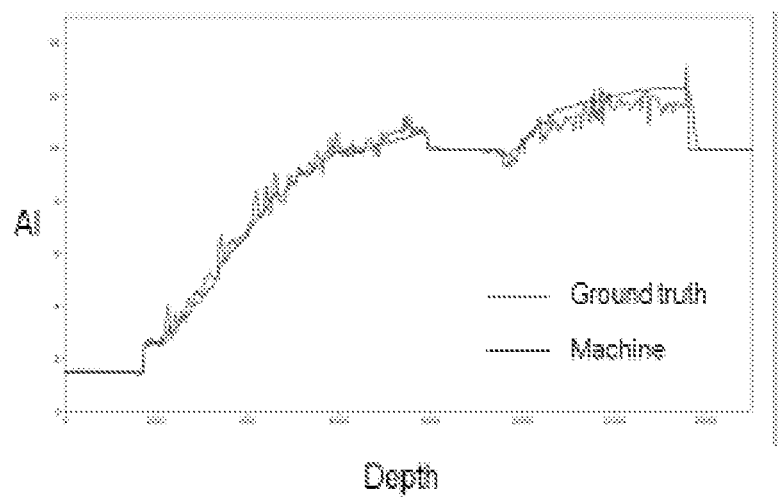
FIGS. 7A and 7B illustrate a comparison of acoustic impedance (AI) at two seismic traces, showing a comparison of the ground truth and the machine estimation, according to an embodiment.
Figure 7B:
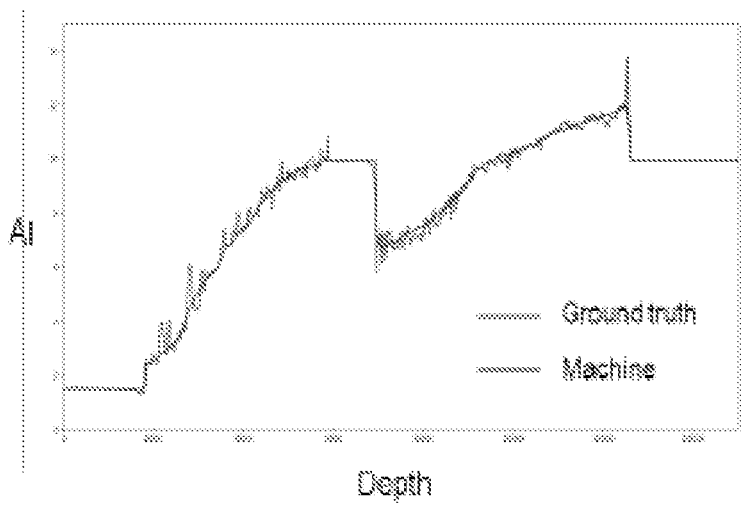

For evaluation and visualization, the results may be compared with the ground truth in two ways, for example. Specifically, FIG. 6 displays the comparison at two inline sections (#2945 and #4685), in each of which a single well (denoted by the arrow) is used for training. FIGS. 7A and 7B display the comparison at two traces penetrating the salt bodies. Compared to the ground truth, the machine prediction, successfully captures the major variations of acoustic impedance at the structural boundaries, including the seafloor and salt bodies. Further, the machine prediction accurately predicts the acoustic impedance in the zones of weak seismic signals, particularly subsalt. The machine prediction also has high lateral continuity, indicating the capability of the proposed workflow in generalizing what it learns from sparse wells to the entire seismic survey.

Embodiments of the present disclosure may provide a method for robust subsurface feature estimation from (e.g., 3D) seismic data, using a workflow capable of efficiently learning from a small amount of sparsely-distributed wells. As tested by the synthetic SEAM dataset, the present method not only accurately captures the major variations of acoustic impedance across the important structural boundaries and even in the zones of weak seismic reflection, but also successfully provides consistent acoustic impedance estimation for the entire seismic survey.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 8:
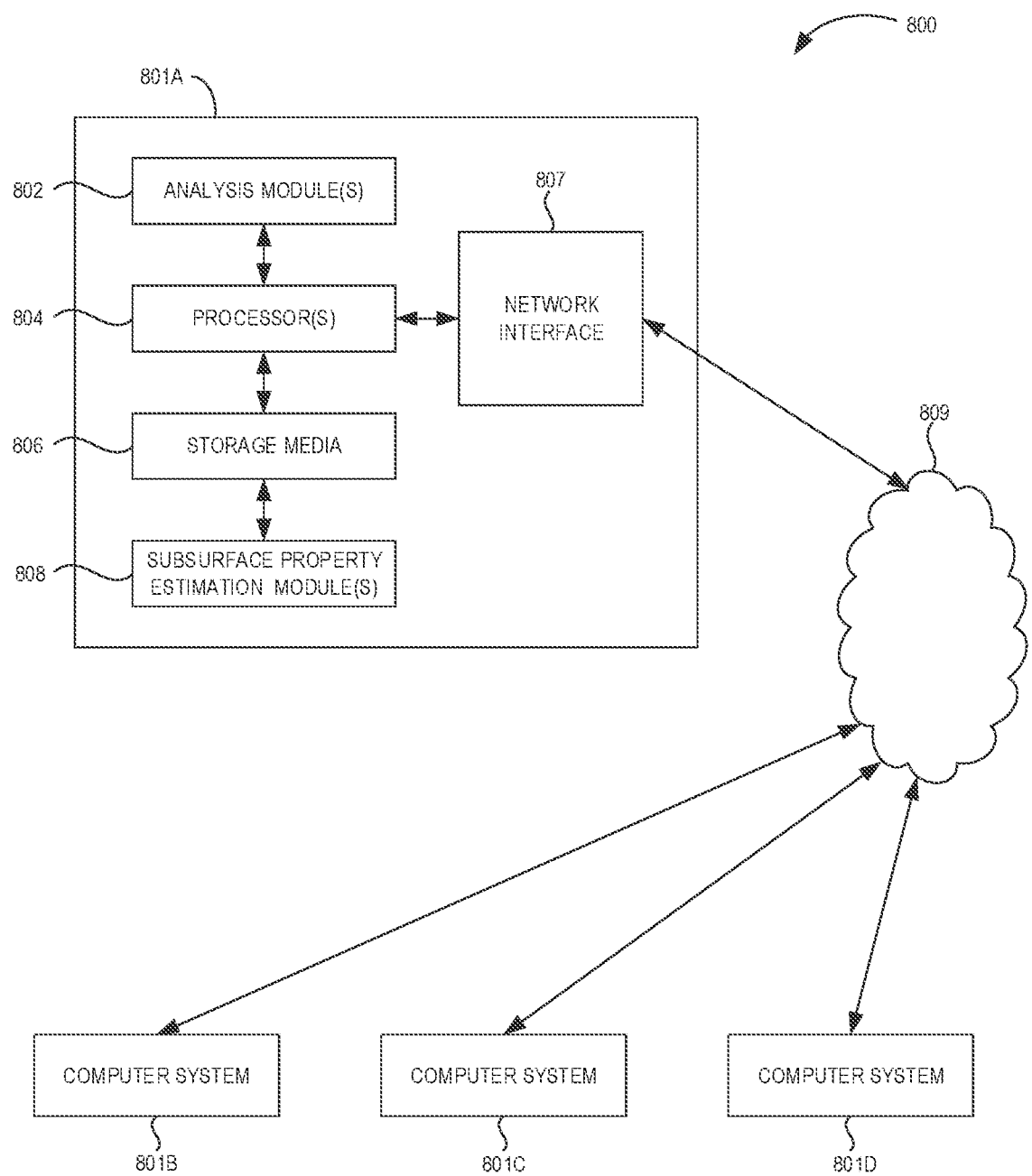
FIG. 8 illustrates a schematic view of a computing system, according to an embodiment.

In some embodiments, any of the methods of the present disclosure may be executed by a computing system. FIG. 8 illustrates an example of such a computing system 800, in accordance with some embodiments. The computing system 800 may include a computer or computer system 801A, which may be an individual computer system 801A or an arrangement of distributed computer systems. The computer system 801A includes one or more analysis module(s) 802 configured to perform various tasks according to some embodiments, such as one or more methods disclosed herein. To perform these various tasks, the analysis module 802 executes independently, or in coordination with, one or more processors 804, which is (or are) connected to one or more storage media 806. The processor(s) 804 is (or are) also connected to a network interface 807 to allow the computer system 801A to communicate over a data network 809 with one or more additional computer systems and/or computing systems, such as 801B, 801C, and/or 801D (note that computer systems 801B, 801C and/or 801D may or may not share the same architecture as computer system 801A, and may be located in different physical locations, e.g., computer systems 801A and 801B may be located in a processing facility, while in communication with one or more computer systems such as 801C and/or 801D that are located in one or more data centers, and/or located in varying countries on different continents).

A processor can include a microprocessor, microcontroller, processor module or subsystem, programmable integrated circuit, programmable gate array, or another control or computing device.

The storage media 806 can be implemented as one or more computer-readable or machine-readable storage media. Note that while in the example embodiment of FIG. 8 storage media 806 is depicted as within computer system 801A, in some embodiments, storage media 806 may be distributed within and/or across multiple internal and/or external enclosures of computing system 801A and/or additional computing systems. Storage media 806 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 800 contains one or more subsurface property estimation module(s) 808. In the example of computing system 800, computer system 801A includes the subsurface property estimation module 808. In some embodiments, a single subsurface property estimation module may be used to perform some or all aspects of one or more embodiments of the methods. In alternate embodiments, a plurality of subsurface property estimation modules may be used to perform some or all aspects of methods.

It should be appreciated that computing system 800 is only one example of a computing system, and that computing system 800 may have more or fewer components than shown, may combine additional components not depicted in the example embodiment of FIG. 8, and/or computing system 800 may have a different configuration or arrangement of the components depicted in FIG. 8. The various components shown in FIG. 8 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 800, FIG. 8), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
receiving, at a first machine learning model comprising an 85-layer convolutional auto-encoder, seismic data representing a subsurface domain in a given area as first training data for the first machine learning model;
training the first machine learning model utilizing the seismic data as training data;
extracting, using the first machine learning model, one or more first seismic features from the seismic data received at the first machine learning model, the seismic data representing the subsurface domain in the given area;
transmitting the one or more first seismic features extracted by the first trained machine learning model as a first portion of second training data;
receiving, at a second machine learning model comprising a deep neural network, the one or more first seismic features extracted by the first trained machine learning model as the first portion of the second training data;
receiving, at the second machine learning model, one or more well logs from one or more existing wells located at respective locations in the given area, the one or more well logs representing one or more subsurface properties in the subsurface domain as a second portion of the second training data;
receiving, at the second machine learning model, the seismic data representing the subsurface domain in the given area as a third portion of the second training data;
training the second machine learning model utilizing the first portion of the second training data, the second portion of the second training data, and the third portion of the second training data;

receiving, at the first machine learning model, second seismic data;

extracting, using the first machine learning model, one or more second seismic features from the second seismic data received at the first machine learning model;

transmitting the one or more second seismic features to the second machine learning model;

predicting, using the second machine learning model, the one or more subsurface properties in the subsurface domain that would normally be captured in a well log at a second location in the given area at which no well log data is available and that does not correspond to any of the respective locations of the one or more existing wells in the given area by making connections between the second seismic data received at the second machine learning model, the one or more well logs, and the one or more second seismic features that were extracted from the second seismic data by the first machine learning model and transmitted to the second machine learning model; and performing at least one drilling operation of a well to be undertaken at the second location in the given area that does not correspond to any of the respective locations of the one or more the existing wells based on the one or more subsurface properties predicted by the second machine learning model.

2. The method of claim 1, wherein the first machine learning model comprises a seismic feature self-learning network.

3. The method of claim 1, wherein the one or more subsurface properties are selected from the group consisting of acoustic impedance, porosity, and density.

4. The method of claim 1, wherein the seismic data comprises three-dimensional seismic data.

5. The method of claim 4, wherein the second machine learning model comprises:
   an encoder configured to extract a set of two-dimension features from the three-dimensional seismic data;
   a decoder configured to combine the set of two-dimensional features into a set of one-dimensional features; and
   a fine-tuner that maps the set of one-dimensional features into a one-dimensional well log.

6. The method of claim 1, wherein the second machine learning model is configured to map the second seismic data, the one or more second seismic features, or both to the one or more well logs, and wherein the predicting is based at least in part on mapping of the second seismic data by the second machine learning model.

7. The method of claim 1, further comprising visualizing the one or more subsurface properties that were predicted on a computer display.

8. The method of claim 1,
   wherein the first seismic data is the same as the second seismic data.

9. A non-transitory computer-readable medium storing instructions that, when executed by at least one processor of a processing system, cause the processing system to perform operations, the operations comprising:
   receiving, at a first machine learning model comprising an 85-layer convolutional auto-encoder, seismic data representing a subsurface domain in a given area as first training data for the first machine learning model;
   training the first machine learning model utilizing the seismic data as training data;
   extracting, using the first machine learning model, one or more first seismic features from the seismic data received at the first machine learning model, the seismic data representing the subsurface domain in the given area;
   transmitting the one or more first seismic features extracted by the first trained machine learning model as a first portion of second training data;
   receiving, at a second machine learning model comprising a deep neural network, the one or more first seismic features extracted by the first trained machine learning model as the first portion of the second training data;
   receiving, at the second machine learning model, one or more well logs from one or more existing wells located at respective locations in the given area, the one or more well logs representing one or more subsurface properties in the subsurface domain as a second portion of the second training data;
   receiving, at the second machine learning model, the seismic data representing the subsurface domain in the given area as a third portion of the second training data;
   training the second machine learning model utilizing the first portion of the second training data, the second portion of the second training data, and the third portion of the second training data;
   receiving, at the first machine learning model, second seismic data;
   extracting, using the first machine learning model, one or more second seismic features from the second seismic data received at the first machine learning model;
   transmitting the one or more second seismic features to the second machine learning model;
   predicting, using the second machine learning model, the one or more subsurface properties in the subsurface domain that would normally be captured in a well log at a second location in the given area at which no well log data is available in the given area and that does not correspond to any of the respective locations of the one or more existing wells in the given area by making connections between the second seismic data received at the second machine learning model, the one or more well logs, and the one or more second seismic features that were extracted from the second seismic data by the first machine learning model and transmitted to the second machine learning model; and
   transmitting the one or more subsurface properties predicted by the second machine learning model to be utilized in performing at least one drilling operation of a well to be undertaken at the second location in the given area at which no well log data is available and that does not correspond to any of the respective locations of the one or more the existing wells.

10. The non-transitory computer-readable medium of claim 9, wherein the first machine learning model comprises a seismic feature self-learning network.

11. The non-transitory computer-readable medium of claim 9, wherein the one or more subsurface properties are selected from the group consisting of acoustic impedance, porosity, and density.

12. The non-transitory computer-readable medium of claim 9, wherein the seismic data comprises three-dimensional seismic data.

13. The non-transitory computer-readable medium of claim 12, wherein the second machine learning model comprises:
   an encoder configured to extract a set of two-dimension features from the three-dimensional seismic data;

a decoder configured to combine the set of two-dimensional features into a set of one-dimensional features; and a fine-tuner that maps the set of one-dimensional features into a one-dimensional well log.

14. The non-transitory computer-readable medium of claim 9, wherein the second machine learning model is configured to map the second seismic data, the one or more second seismic features, or both to the one or more well logs, and wherein the predicting is based at least in part on mapping of the second seismic data by the second machine learning model.

15. The non-transitory computer-readable medium of claim 9, wherein the operations further comprise visualizing the one or more subsurface properties that were predicted on a computer display.

16. A computing system, comprising:
one or more processors; and
a memory system including one or more non-transitory computer-readable media storing instructions that, when executed by at least one of the one or more processors, causes the computing system to perform operations, the operations comprising:
receiving, at a first machine learning model comprising an 85-layer convolutional auto-encoder, seismic data representing a subsurface domain in a given area as first training data for the first machine learning model;
training the first machine learning model utilizing the seismic data as training data;
extracting, using the first machine learning model, one or more first seismic features from the seismic data received at the first machine learning model, the seismic data representing the subsurface domain in the given area;
transmitting the one or more first seismic features extracted by the first trained machine learning model as a first portion of second training data;
receiving, at a second machine learning model comprising a deep neural network, the one or more first seismic features extracted by the first trained machine learning model as the first portion of the second training data;
receiving, at the second machine learning model, one or more well logs from one or more existing wells located at respective locations in the given area, the one or more well logs representing one or more subsurface properties in the subsurface domain as a second portion of the second training data;
receiving, at the second machine learning model, the seismic data representing the subsurface domain in the given area as a third portion of the second training data;
training the second machine learning model utilizing the first portion of the second training data, the second portion of the second training data, and the third portion of the second training data;
receiving, at the first machine learning model, second seismic data;
extracting, using the first machine learning model, one or more second seismic features from the second seismic data received at the first machine learning model;
transmitting the one or more second seismic features to the second machine learning model;
predicting, using the second machine learning model, the one or more subsurface properties in the subsurface domain that would normally be captured in a well log at a second location in the given area at which no well log data is available and that does not correspond to any of the respective locations of the one or more existing wells in the given area by making connections between the second seismic data received at the second machine learning model, the one or more well logs, and the one or more second seismic features that were extracted from the second seismic data by the first machine learning model and transmitted to the second machine learning model; and
transmitting the one or more subsurface properties predicted by the second machine learning model to be utilized in performing at least one drilling operation of a well to be undertaken at the second location in the given area at which no well log data is available and that does not correspond to any of the respective locations of the one or more the existing wells.

17. The computing system of claim 16, wherein the first machine learning model comprises a seismic feature self-learning network.

18. The computing system of claim 16, wherein the one or more subsurface properties are selected from the group consisting of acoustic impedance, porosity, and density.

19. The computing system of claim 16, wherein the seismic data comprises three-dimensional seismic data, and wherein the second machine learning model comprises:
an encoder configured to extract a set of two-dimension features from the three-dimensional seismic data;
a decoder configured to combine the set of two-dimensional features into a set of one-dimensional features; and
a fine-tuner that maps the set of one-dimensional features into a one-dimensional well log.

* * * * *